(12) United States Patent
Torres Junco et al.

(10) Patent No.: US 8,333,034 B2
(45) Date of Patent: Dec. 18, 2012

(54) SUPPORT FOR HOLDING FLOATING PLANT SPECIES CULTURES

(76) Inventors: Vicente Juan Torres Junco, Guadalix de la Sierra (ES); Javier Riesco Prieto, Madrid (ES); Pablo Riesco Prieto, Zamora (ES)

( * ) Notice: Subject to any disclaimer, the term of this patent is extended or adjusted under 35 U.S.C. 154(b) by 1048 days.

(21) Appl. No.: 12/089,851

(22) PCT Filed: Oct. 13, 2006

(86) PCT No.: PCT/ES2006/000570
§ 371 (c)(1),
(2), (4) Date: Aug. 5, 2008

(87) PCT Pub. No.: WO2007/042589
PCT Pub. Date: Apr. 19, 2007

(65) Prior Publication Data
US 2009/0217580 A1  Sep. 3, 2009

(30) Foreign Application Priority Data

Oct. 13, 2005  (ES) .................................. 200502496

(51) Int. Cl.
*A01G 31/00*  (2006.01)
(52) U.S. Cl. ............................................ 47/63; 47/66.6
(58) Field of Classification Search .................. 47/59 R, 47/59 S, 64, 62 R, 62 C, 62 A, 62 N, 63, 47/65.5, 65.7, 65.8, 66.6, 66.7, 904, 41.01, 47/41.12, 41.13, 41.15
See application file for complete search history.

(56) References Cited

U.S. PATENT DOCUMENTS

| | | | | |
|---|---|---|---|---|
| 3,199,250 A * | 8/1965 | Sawyer | .............................. | 47/63 |
| 4,037,362 A * | 7/1977 | Finck | .............................. | 47/59 R |
| 4,622,775 A * | 11/1986 | Glenn et al. | ....................... | 47/63 |
| 4,976,064 A * | 12/1990 | Julien | .............................. | 47/63 |
| 5,225,342 A * | 7/1993 | Farrell | .......................... | 435/430 |
| 5,324,657 A * | 6/1994 | Tanny | .......................... | 435/420 |
| 6,843,021 B1 | 1/2005 | Huang | | |
| 7,069,691 B2 * | 7/2006 | Brooke et al. | ................. | 47/59 R |
| 7,278,238 B2 * | 10/2007 | Maniscalco et al. | ........... | 47/65.6 |
| 7,296,379 B1 * | 11/2007 | Peter | .............................. | 47/33 |
| 2005/0005512 A1 * | 1/2005 | Boxsell | .............................. | 47/39 |
| 2008/0099096 A1 * | 5/2008 | Kania et al. | ................ | 139/383 R |
| 2009/0158651 A1 * | 6/2009 | Becker | .............................. | 47/65 |

FOREIGN PATENT DOCUMENTS

| | | |
|---|---|---|
| EP | 0036723 | 9/1981 |
| ES | 269842 | 8/1961 |
| JP | 6178625 | 6/1994 |
| JP | 11056138 | 3/1999 |
| WO | WO 98/45213 | 10/1998 |

* cited by examiner

*Primary Examiner* — Trinh Nguyen
(74) *Attorney, Agent, or Firm* — Merchant & Gould P.C.

(57) ABSTRACT

The invention relates to a support for holding floating plant species cultures, said support being configured to be held by at least two independent supporting elements (10). The support comprises a planar lattice structure (1) having at least one housing (2-3) configured to house at least one seed, plant, part of a plant and/or combinations thereof, and at least two anchoring elements (5-6) for the anchoring to the independent supporting elements (10) configured to compensate the moments and forces generated by the portion of the plant projecting from the water level with respect to the point of intersection of said portion with the plane defined by the structure (1), until a growth stage in which the plant survives and reproduces on its own upon proliferation of the roots and/or rhizomes thereof, and to transmit said moments and forces to the independent supporting elements (10).

9 Claims, 3 Drawing Sheets

SUPPORT FOR HOLDING FLOATING PLANT SPECIES CULTURES

FIELD AND OBJECT OF THE INVENTION

The invention is comprised within the field of cultivation of floating plant species and more specifically, it relates to a support for sowing and cultivating seeds, plants or parts thereof, such as for example cuttings, rhizomes, bulbs etc., on the surface of aquatic media such as for example, lakes, channels, etc., such that they can grow on the aquatic medium having said support as a supporting means, which support will in turn be connected to independent supporting elements arranged on the surface of the aquatic medium.

STATE OF THE ART

The traditional process for growing plants in water is known as hydroponic cultivation and consists of planting and cultivating in water without the need for soil; nevertheless these plants may always be supported in a substrate or a container which is immersed in water and is in turn supported by solid ground or a structure which is secured in the ground.

This type of cultures is being used in the purification of waste water and contaminant spills by means of a floating macrophyte filter. For example, patent document WO 98/45213 describes a purification system of this type based on planting macrophytes on the water surface;

The processes used for setting macrophyte plants in place is based on placing the plants or rhizomes on floating supports, it being necessary for each plant to reach the corresponding channel or aquatic medium with the fixing system incorporated. As described in said document, a wire with a small diameter (less than 1 mm) may be used as a plant fixing system, which wire has an end wound around the root system or the leaves of the plant and the other end ending in a clip or a similar system, for quick and free fixing in order to carry out a quick attachment to the floating elements.

In the purifiers installed up until now, a plurality of polyethylene tubes are used as independent supporting elements, which tubes are closed at their ends to prevent the passage of water therein and to ensure the buoyancy of the tubes to which the plants tied by the free end of the wire are fixed, which tubes are joined to the plant through the root ball of such plant. The plants, upon growing secured in this manner, rotate as they grow on the tube, until the roots turn over and are in the air and the leaves are in the water, inverted with respect to their natural position. Most plants die with the roots being upwards or out of the water and the leaves being downwards or in the water, it being necessary on many occasions to re-plant or replace the plants that die or are released from the tube, delaying the formation of the macrophyte filter.

In other purifiers which have been constructed from floating macrophytes, it has been necessary to plant these plants in water, testing different ways to support the plant which are described below:

The first test was to hold the plant between two tubes, one of which is a floating polyethylene tube and the other of which is a rubber tube, which tubes will be linearly joined every 50 cm distance by metal clamps. To carry out the planting, the tubes are separated and the plant is introduced in the area close to the joining of the tubes with the clamp and is located between the two tubes, the tubes being joined again by means of another clamp, the plant thus being held between the tubes, the "rigid" polyethylene tube and the "elastic" rubber tube, and between the two clamps, the plant is thus held by pressure between the two tubes and the two clamps but the plant is continuously subjected to a certain pressure between the two tubes which causes the constriction thereof and therefore its death, it being necessary to re-plant again and in another manner (in three channels).

Another option is to arrange floating tubes so as to arrange a chicken coop type metal fabric; the root system of each plant will pass between the mesh gaps, and the base of the leaves of such plant is previously traversed diametrically with a wooden or wire rod with a length greater than that of the mesh gap; the plant is thus secured to the chicken coop mesh by means of rod the traversing it. But with this system, the plant is subjected to considerable physical damage, as well as an important delay in the growth of the plant or even its death, having to replant several times in order to achieve the weave of the plant roots necessary for the system to work correctly.

Another option is to sow on a floating carpet with a thickness of more than three centimeters of plant fibers (coconut fiber). The root system of the plants is arranged between the fibers, whereby their roots are bathed by the water and their leaves emerge in the air above the fiber carpet. The fiber absorbs water over time and the carpet starts to sink in the water, taking the plants with it, whereby such plants die when they are immersed.

Furthermore, in the previous case, the plants started to die because they had contracted a disease caused by a fungus present in the channels; they were then treated with a polyvalent fungicide but the death of the plants could not be stopped. This fungus had also been imported with the coconut fiber carpet. In addition to the microbial contamination by bacteria, viruses and fungi, this system also has the unwanted transfer and spread of insects and small animals from one place to another. Another serious drawback is that when the fibers rot, they contaminate the water with their own matter, increasing the biological and chemical oxygen demand of the latter; therefore they tend to cause the eutrophication of the water with their own material constituents.

Another system is based on the use of an always upright stand, consisting of allowing the plant to grow inside an unclosed cylindrical tube with peripheral walls having a diameter of about 3 cm and a height of about 5 cm; the cylinder is manufactured starting from a metal sheet with a thickness of several tenths, cylindrically bending this sheet and axially overlapping the ends. When the root system of the plant reaches a development such that it fills the inside of the cylinder, it presses the walls of the cylinder. The cylinder and plant assembly is later embraced with another cylinder with thick walls (3 cm thick) and constructed with a material having a very low density, such that the weight of the assembly of the root ball, plant and cylinders is less than that of the water removed by the cylinders and the root ball with its root system (the cylinder is manufactured with a heat insulator tube, a "heating jacket used to envelop a heating or hot water cylindrically pipe from its environment"), to achieve the always upright stand, a wire with a length of about 25 cm is fixed to the shaft of the cylinder, to which wire considerable weight (17 grams) is fixed.

The always upright stand units with the plant are fixed to a rope, whereby strings of plants separated from one another by the suitable distance are formed. This system has the serious drawback that as the plant starts to grow, the center of gravity shifts and it stops being an always upright stand, since the plant has been introduced in a cylinder and the rhizomes cannot come out laterally, they cannot extend around the plant through the water and as this plant starts to have a certain height, the balance of the assembly is lost and the plant is placed horizontally in the water, and only some plants can survive due to the fact that some of the rhizomes have managed to escape through the ends of the cylinder before the plant loses its balance. This system behaves identically or is physically similar to the one described first when the plant is fixed to a tube by means of a wire where the overturning moment occurring when the plant grows causes it to be placed horizontally in the water. The overturning moment is further very significantly increased by the wind when it hits against the part in the air emerging from the always upright stand assembly, the plant being able to be placed horizontally in the water before reaching the unbalance due to the shift of the center of gravity.

Other systems used consists of planting in water with cylindrical supports having a length of several meters and a diameter of about 40 cm, obtained by winding a coconut fiber blanket in the form of a pillow, but this form has not achieved a floating, stable and long-lasting plantation in water up until now.

Spanish utility model number 269842 describes a device for cultivating plants without soil having a porous plate and a floating rack adapted to be held in a fixed manner in a peripheral part of said porous plate. The buoyancy of the assembly is such that the porous layer is in direct contact with the water surface. The rack is formed by two ring-shaped elements with a semicircular section forming a circular tubular body upon being joined.

The drawback of this device is that when the plants have acquired a certain degree of growth, the weight of the stem and of the leaves makes the plant overturn, the roots losing contact with the water and the leaves being immersed, making the plant die.

Patent document U.S. Pat. No. 6,843,021 describes a floating device for cultivating plants having a plurality of hollow floating bodies, each of which has a container for containing the plant encased on a first passage or recess located in the central area of the mentioned floating body. The floating bodies are directly joined to one another through connection means including different engaging ends to be placed on second passages defined on different parts of the floating bodies.

Although the described device can be connected to other identical devices, it cannot be joined to independent floating bodies, whereby the position of the assembly of floating bodies once they are joined will not be fixed at any time and therefore there may be risk of the assembly overturning.

Due to the foregoing, a need has been detected to provide a support for planting and cultivating floating plants which prevents the mentioned problems as much as possible and the design of which is very simple; a planar lattice structure has therefore been designed having a plurality of housings to receive a seed, plant or parts thereof and further having anchoring elements for the anchoring to supporting elements which are arranged in the aquatic medium in question and which are independent and suitably fixed to fixed points located in areas outside the contour defined by said aquatic medium, both the structure and the anchoring elements being configured such that the moments and forces generated by the portion of the plant projecting from the water level are compensated with respect to the point of intersection of said portion with the plane defined by the structure, until a certain growth stage of the plant.

This objective is achieved by means of the invention as defined in claim 1; the preferred embodiments of the invention are defined in the dependent claims.

DESCRIPTION OF THE INVENTION

The present invention relates to a support for holding floating plant species cultures, said support being configured to be supported by at least two independent supporting elements of the support.

The support comprises a planar lattice structure having at least one housing configured to hold a seed, plant, part of a plant and/or combinations thereof and at least two anchoring elements for the anchoring to the independent supporting elements configured to compensate the moments and forces generated by the portion of the plant projecting from the water level with respect to the point of intersection of said portion with the plane defined by the structure, until a growth stage in which the plant survives by itself upon proliferation of the roots and/or rhizomes thereof, and to transmit said moments and forces to the independent supporting elements.

In this way and thanks to the configuration of the support, since the structure is planar and given that the independent supporting elements are always located in a plane parallel to the free surface of the aquatic medium, providing the mentioned structure with anchoring means keeping the structure in said plane, the moments, especially the overturning moments with respect to axes contained in the mentioned plane, caused by the part of the plant that is not immersed, are compensated.

The structure has been designed so that the moments are compensated until a certain growth of the plant, specifically until the plant survives by itself upon a certain amount of roots developing such that even though the plant can overturn, there is a sufficient portion of the plant that is not immersed so that such plant can survive and continue to develop. Furthermore, due to the lattice work of the planar structure, the plant can develop in subsequent stages by anchoring its rhizomes and roots on different housings of the structure and can even be directly supported on the independent supporting elements.

The housings will be configured so as to be able to house a component selected from a substrate, fertilizers, nutrients, trace elements, or combinations thereof and/or a plant protection product.

The mentioned components can thus be placed in the area surrounding the plant for the purpose of facilitating the absorption of such components by the plant.

The housings have a plurality of mechanical holding elements configured to keep the plant upright in its early growth stages. The mechanical holding elements can specifically be arranged discontinuously along the inner contour of the housings, consisting of flanges located coplanarly to the support structure, being finished in areas for supporting the plant stem. The areas for supporting the mechanical holding elements consist of rounded, sharp, planar ends, the thickness thereof being such that the end behaves like a band upon bending, tending to recover its shape.

Given that the ends manage to slightly press and simultaneously hold the elements, such as the plants, which are intended to be held in the lattices, a correct and safe supporting of the plant is thus enabled during the first growth stages thereof without damaging the stem thanks to the ends of the mechanical holding elements and at the same time it is achieved that said supporting does not cause the constriction of the stem and therefore the premature death of the plant as it grows, because the flanges are arranged discontinuously, allowing the growth of the stem in the spaces existing between such flanges.

One of the housings is normally arranged in a centered manner with respect to the planar lattice structure and the remaining housings are protected between said housing and the edged defining the contour of the planar lattice structure.

The existence of an initial balance of the forces in the structure is thus allowed since one of the housings is centered.

At least one container can optionally be arranged in at least one of the housings, said container being configured to allow the exchange of substances of the seed, plant or a part of the plant with the aquatic medium. This container will be used for the cases in which the mechanical holding elements are not enough to contain the mentioned elements, given the size of the of the seed, plant or component to be introduced in the housings The planar structure is trapezoidal, the anchoring elements being located in its corners, two anchoring elements being connected to an independent supporting element and the other two anchoring elements being connected to the independent supporting element immediately contiguous to the previous one, said elements having projections configured to allow fitting therein the independent supporting elements such that two of said anchoring elements tend to separate the independent supporting elements and the other two anchoring elements tend to bring said supporting elements closer together.

In this way, with the described configuration of both the planar structure and the anchoring elements, it is possible to fix the relative movement of the planar structure with respect to the independent supporting elements.

DESCRIPTION OF THE DRAWINGS

A series of drawings is very briefly described below which aid in better understanding the invention and are expressly related to several embodiments of said invention, set forth as illustrative and non-limiting examples thereof.

DESCRIPTION OF EMBODIMENTS OF THE INVENTION

Figure 1:
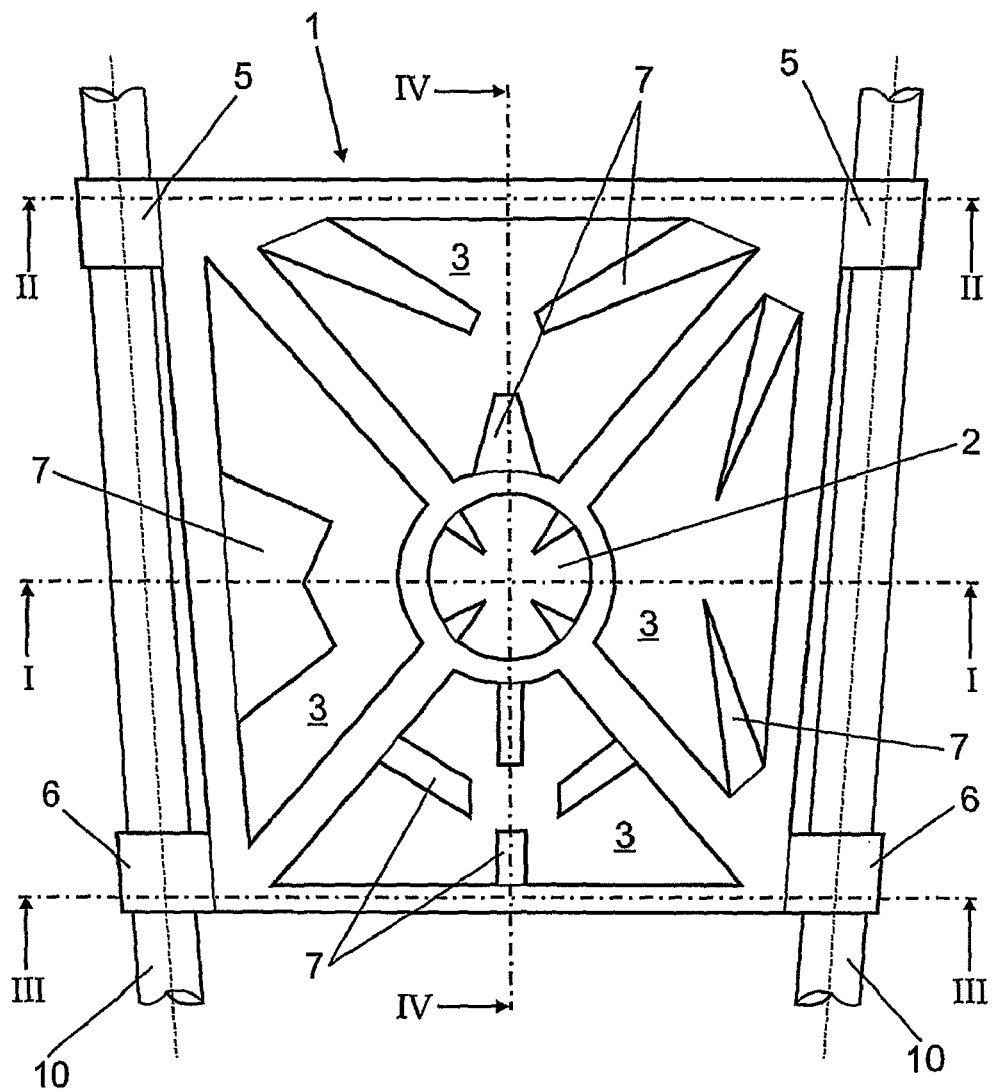
FIG. 1 shows a plan view of the support for holding floating plant species cultures object of the present invention.
Figure 2:
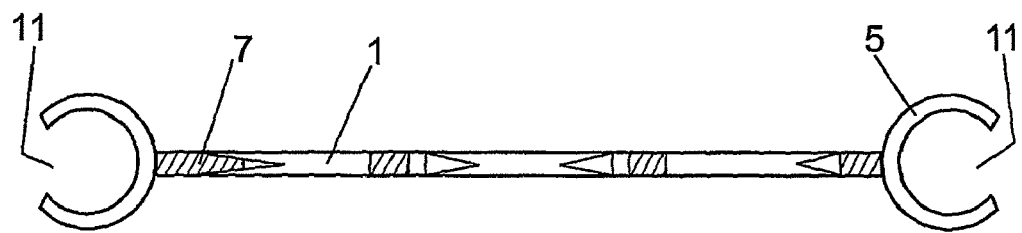
FIG. 2 shows a sectional view of the support of FIG. 1 according to section plane I-I.
Figure 3:
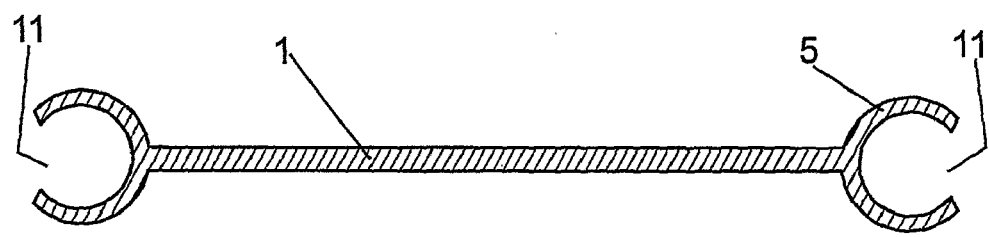
FIG. 3 shows a sectional view of the support of FIG. 1 according to section plane II-II, for a first embodiment of the invention.
Figure 4:
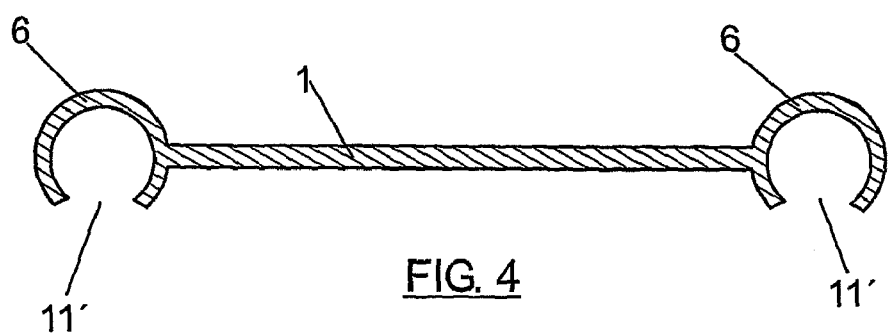
FIG. 4 shows a sectional view of the support of FIG. 1 according to section plane III-III, for a first embodiment of the invention.
Figure 5:
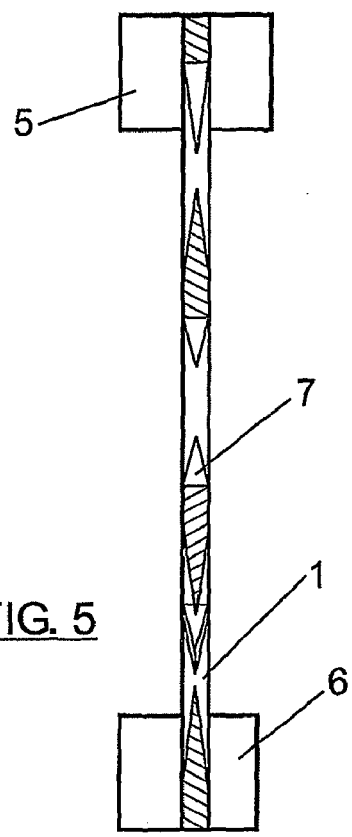
FIG. 5 shows a sectional view of the support of FIG. 1 according to section plane VI-VI

As can be seen in FIG. 1, the support for holding floating plant species cultures object of the present invention consists of a planar structure (1) formed by a plurality of lattices with a different size and shape. The mentioned structure has several housings (2, 3) which are configured to hold at least one seed, plant or part thereof, such as for example a cutting or a rhizome. The structure also has a plurality of anchoring elements (5-6) for connecting the structure (1) to independent supporting elements (10). Said anchoring elements (5-6) are configured to compensate the moments and forces generated by the portion of the plant projecting from the water level with respect to the point of intersection of said portion with the plane defined by the structure (1). This moment will be compensated until a certain development stage of the plant in which it will have produced sufficient rhizomes to survive and reproduce in the event that it overturns and its leaves and stem are partially immersed in the aqueous medium.

In a first embodiment of the invention, the anchoring elements (5-6) will be four in number, although the number of anchoring elements can vary according to the geometry of the planar structure for each particular case, there necessarily being at least two in number. The anchoring elements (5-6) will be located in the corners of the planar structure which is approximately trapezoidal for this embodiment, two anchoring elements being connected to an independent supporting element and the other two anchoring elements being connected to the supporting element immediately contiguous to the previous one. In this case, the independent supporting elements (10) will consist of tubular bodies closed at their ends, such that in a certain amount of air is contained therein such that said bodies float; said floating elements will tend to be parallel and will further be able to support the weight of the assembly of supports joined thereto and of the plants which will grow therein until a certain development stage thereof. The independent supporting elements can alternatively be mesh networks or structures with the condition that at least one support such as the support object of the present invention can be introduced in its gaps.

The shape and position of the anchoring elements can vary with respect to the structure (1), both features depending on one hand on the shape of the planar structure (1) and on the other hand, on the arrangement of the independent supporting elements (10).

The anchoring elements (5-6) will in turn have projections configured to allow joining and fitting therein the independent supporting elements such that two of said anchoring elements tend to separate the independent supporting elements and the other two anchoring elements tend to move said supporting elements closer together.

As can be seen in FIGS. 2 to 5, in a first embodiment, specifically the anchoring elements (5-6) will have the form of a semicircular clamp and will have an opening (11-11') or mouth for introducing the independent supporting elements (10). Said opening will be located in a different place depending on whether the anchoring element tends to join or separate the independent supporting elements. In the case of the anchoring elements (6) tending to join the independent supporting elements (10), which are arranged on the ends of the shorter side of the trapezoid forming the planar structure (1), the openings (11') are arranged at the lower part of the clamps so that the latter act as a hook and tend to move the independent supporting elements (10) closer together. On the other hand, in the anchoring elements (5) associated to the longer side of the trapezoid, the opening (11) of the clamps is arranged at their central part whereby their assembly on the independent supporting means (10) is favored, while at the same time achieving the tendency to simultaneously separate and join the independent supporting elements (10).

This configuration of the structure, a trapezoidal structure with different sides, and the different configuration of the anchoring elements (5-6) depending on the side of the trapezoid they are located on, allows creating reactive forces between said anchoring elements (5-6) and the independent supporting elements (10) in which they are assembled, not allowing the relative movement of the structures (1) with respect to the mentioned independent supporting elements (10). The shape of the planar structure is not limiting and can adopt any known geometric shape.

Figure 6:
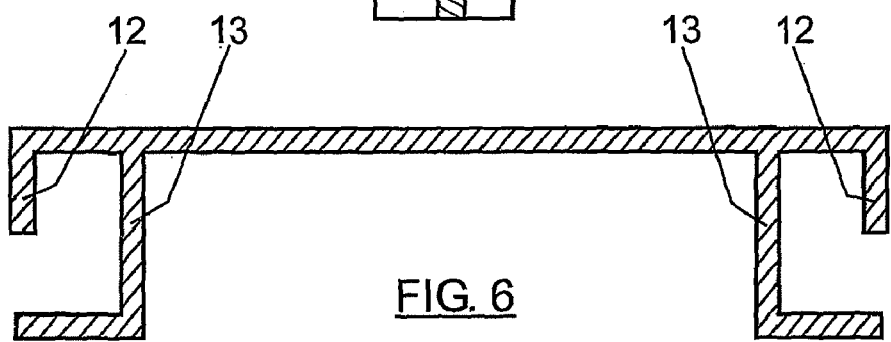
FIG. 6 shows a sectional view of the support of FIG. 1 according to section plane II-II, for a second embodiment of the invention.
Figure 7:
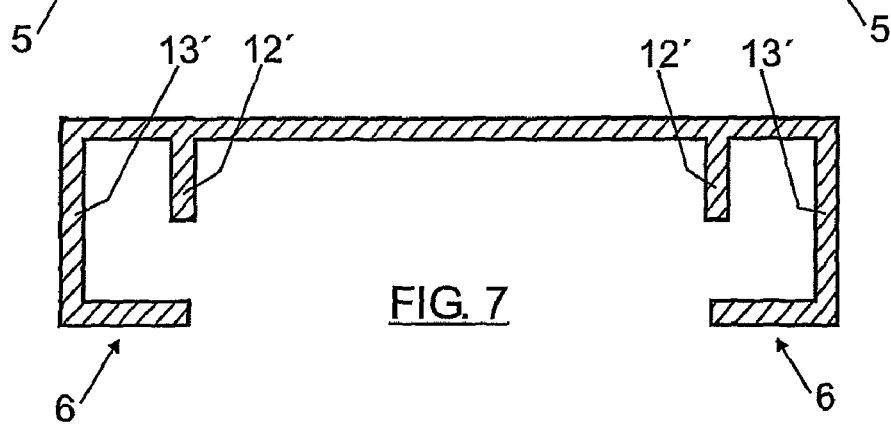
FIG. 7 shows a sectional view of the support of FIG. 1 according to section plane III-III, for a second embodiment of the invention.

In a second embodiment of the invention, FIGS. 6 and 7, the configuration of the anchoring elements will vary, there being two types of projections, first short projections (12-12') and second longer projections (13-13') bent at their ends, all the projections starting from the lower face of the structure (1).

In the case of the projections (6) tending to move the independent supporting elements (10) closer together, the first projections (12') will be located in a more inner position than the second projections (13'), the bend of the latter being towards the inside so that they act as hooks for bringing the independent supporting elements (10) closer together. In the case of the projections (5) tending to separate the independent supporting elements (10), the first projections (12) are located in a more outer position than the second projections (13), the bend of the latter being towards the outside for the purpose of being able to safely retain the independent supporting elements (10).

In both embodiments of the invention, a central housing (2) may be provided, which in this case can be circular by way of example, and the remaining housings (3) will be defined by the outer contour of the central housing, a series of diagonal struts and the inner face of the edges defining the trapezoidal contour of the planar structure (1).

In addition to the seed or the plant, another series of products or elements, such as for example a substrate for increasing the growth of the plant, as well as fertilizers or another type of nutrients or trace elements, can be deposited in the housings (2-3). Plant protection products can also be deposited for the treatment of possible diseases that the plant may suffer from. In the same manner, buoys or similar elements increasing the buoyancy of the assembly, as well as signs in which legends aiding in identifying and studying the development of the plant are placed, can also be placed in said housings.

A series of mechanical holding elements (7) for holding the seed or plant is arranged in the different housings (2-3) of the planar structure (1), the main mission of which elements is to be used mainly as a support for the plant stem which will grow, being held by said mechanical holding elements (7) and even by the edges of the housings which house them or the lattices of the planar structure (1).

Given that the support object of the invention has been designed such that it allows the horizontal support of both plants and seeds and parts of plants, a series of mechanical holding elements (7) has been placed in each of the housings (2-3), in all the cases arranged on the inner contour of said housings and located discontinuously therein, being formed in a plurality of tabs or flanges which can vary in number and shape for each of the housings, the purpose of which is to support plants in different growth stages in which the diameter of the stem is different, the mentioned discontinuity therein being useful for allowing the subsequent growth of the plant without causing the constriction thereof and therefore the death of the plant.

The mechanical holding elements (7) will have rounded, sharp, planar ends and can form different angles with respect to the contours of the housings (2-3), the thickness of said mechanical holding elements (7) being such that it allows them to act as bands which will have shape and position recovery memory to thus hold the plants, rhizomes, stems, seeds and/or containers or vessels.

The collaboration of a container (not shown in the Figure) will be necessary in the case of depositing small elements in the housings (2-3) such as for example seeds, fertilizers, or plant protection products.

The container can have any shape and dimensions such that it can be coupled inside the housings (2-3). The mentioned container can further be shaped to allow the exchange of substances of the seed, plant or a part of the plant with the aquatic medium. To that end, the container can have a series of openings for the mentioned exchange or can be a mesh or can even be porous depending on each case.

The invention claimed is:

1. A support for holding floating plant species cultures, said support being held by at least two independent supporting elements, the support comprising a planar lattice structure having at least one housing, the housing containing at least one seed, plant, part of a plant or combinations thereof, and at least two anchoring elements anchored to the independent supporting elements;

said anchoring elements extending out of a plane defined by the structure to compensate moments and forces generated by a portion of the plant projecting from a water level with respect to a point of intersection of said portion with the plane defined by the structure, until a growth stage in which the plant survives and reproduces on the plant's own upon proliferation of roots or rhizomes thereof; and said anchoring elements transmitting said moments and forces to the independent supporting elements, wherein the planar lattice structure is trapezoidal, the anchoring elements being located in corners of the planar lattice structure, two anchoring elements being connected to an independent supporting element and the other two anchoring elements being connected to the independent supporting element immediately contiguous to a previous supporting element, said anchoring elements having projections, the independent supporting elements fitting into the projections such that two of said anchoring elements separate the independent supporting elements, and the other two anchoring elements bring said supporting elements closer together.

2. A support according to claim 1, wherein the housings contain a component selected from a substrate, fertilizers, nutrients, trace elements or combinations thereof.

3. A support according to claim 1, wherein the housings contain a plant protection product.

4. A support according to any claim 1, wherein the housings have a plurality of mechanical holding elements holding the plant upright in early growth stages.

5. A support according to claim 4 wherein the mechanical holding elements are discontinuously arranged along an inner contour of the housings.

6. A support according to claim 5, wherein the mechanical holding elements comprise
flanges or tabs located coplanarly to the support structure, being finished in areas for supporting the plant stem.

7. A support according to claim 6, wherein the areas for supporting the mechanical holding elements comprise angular, rounded, sharp, planar ends, the thickness thereof being such that the end is resilient to recover the mechanical holding element's shape.

8. A support according to claim 1, wherein one of the housings is arranged in a centered manner with respect to the planar lattice structure and the remaining housings are protected between said housing and edges defining a contour of the planar lattice structure.

9. A support according to claim 1, wherein at least one container is arranged in at least one of the housings, said container retaining the plants, wherein substances of the seed, plant or part of the plant are exchanged with the aquatic medium.

* * * * *